US008825286B2

(12) United States Patent
Kroeger

(10) Patent No.: US 8,825,286 B2
(45) Date of Patent: Sep. 2, 2014

(54) METHOD AND DEVICE FOR DETERMINING A CENTER OF GRAVITY OF A MOTOR VEHICLE

(75) Inventor: Patrick Kroeger, Heilbronn (DE)

(73) Assignee: Robert Bosch GmbH, Stuttgart (DE)

( * ) Notice: Subject to any disclaimer, the term of this patent is extended or adjusted under 35 U.S.C. 154(b) by 654 days.

(21) Appl. No.: 13/063,904

(22) PCT Filed: Aug. 25, 2009

(86) PCT No.: PCT/EP2009/060933
§ 371 (c)(1),
(2), (4) Date: May 13, 2011

(87) PCT Pub. No.: WO2010/034580
PCT Pub. Date: Apr. 1, 2010

(65) Prior Publication Data
US 2011/0224895 A1 Sep. 15, 2011

(30) Foreign Application Priority Data

Sep. 29, 2008 (DE) .......................... 10 2008 042 433

(51) Int. Cl.
G06F 17/00 (2006.01)
G06F 19/00 (2011.01)
G06F 17/10 (2006.01)
(52) U.S. Cl.
USPC .............. 701/36; 701/124; 340/440; 180/282
(58) Field of Classification Search
USPC .............. 701/1, 36, 37, 38, 41, 42, 48, 65, 69, 701/70, 71, 72, 74, 82, 90, 91, 124; 340/438, 439, 440; 180/197, 271, 282
See application file for complete search history.

(56) References Cited

U.S. PATENT DOCUMENTS

| 4,767,588 | A | * | 8/1988 | Ito .................... 701/41 |
| 5,311,431 | A | | 5/1994 | Cao et al. |
| 6,508,102 | B1 | * | 1/2003 | Margolis et al. ............ 73/8 |
| 6,526,334 | B1 | | 2/2003 | Latarnil et al. |
| 7,158,866 | B2 | * | 1/2007 | Gustafsson et al. ........... 701/1 |
| 7,885,750 | B2 | * | 2/2011 | Lu .................. 701/90 |
| 2007/0288152 | A1 | * | 12/2007 | Lu et al. .............. 701/70 |

FOREIGN PATENT DOCUMENTS

| CN | 2816779 | 9/2006 |
| DE | 19623595 | 12/1997 |
| DE | 102004056108 | 9/2005 |
| EP | 0523397 | 6/1992 |

OTHER PUBLICATIONS

International Search Report, PCT International Patent Application No. PCT/EP2009/060933, dated Nov. 3, 2009.

* cited by examiner

Primary Examiner — Thomas Tarcza
Assistant Examiner — Edward Pipala
(74) Attorney, Agent, or Firm — Kenyon & Kenyon LLP

(57) ABSTRACT

A method and an apparatus for determining a center of gravity of a motor vehicle are described. In said method and apparatus, for at least one wheel of the motor vehicle, two different drive force values representing a drive force are determined. In addition, longitudinal acceleration values associated with the determined drive force values, and wheel slip values associated with the determined drive force values, are determined. As a function of the drive force values, the associated longitudinal acceleration values and the associated wheel slip values that are determined, coordinates of the center of gravity of the vehicle are determined.

12 Claims, 3 Drawing Sheets

$$\dot{\omega}_{Fl}(t) = \frac{1}{J_R}\left[T_{Fl}(t) + \frac{c_F \cdot m \cdot r \cdot (g \cdot l_R - a_x(t) \cdot h)(v(t) - \omega_{Fl}(t) \cdot r)\left[-a_y(t) \cdot h + g\left(\frac{w}{2} + y\right)\right]}{g \cdot l \cdot v_x(t) \cdot w}\right]$$

$$\dot{\omega}_{Fr}(t) = \frac{1}{J_R}\left[T_{Fr}(t) + \frac{c_F \cdot m \cdot r \cdot (g \cdot l_R - a_x(t) \cdot h)(v(t) - \omega_{Fr}(t) \cdot r)\left[a_y(t) \cdot h + g\left(\frac{w}{2} - y\right)\right]}{g \cdot l \cdot v_x(t) \cdot w}\right]$$

$$\dot{\omega}_{Rl}(t) = \frac{1}{J_R}\left[T_{Rl}(t) + \frac{c_R \cdot m \cdot r \cdot (g \cdot (l - l_R) + a_x(t) \cdot h)(v(t) - \omega_{Rl}(t) \cdot r)\left[-a_y(t) \cdot h + g\left(\frac{w}{2} + y\right)\right]}{g \cdot l \cdot v_x(t) \cdot w}\right]$$

$$\dot{\omega}_{Rr}(t) = \frac{1}{J_R}\left[T_{Rr}(t) + \frac{c_R \cdot m \cdot r \cdot (g \cdot (l - l_R) + a_x(t) \cdot h)(v(t) - \omega_{Rr}(t) \cdot r)\left[a_y(t) \cdot h + g\left(\frac{w}{2} - y\right)\right]}{g \cdot l \cdot v_x(t) \cdot w}\right]$$

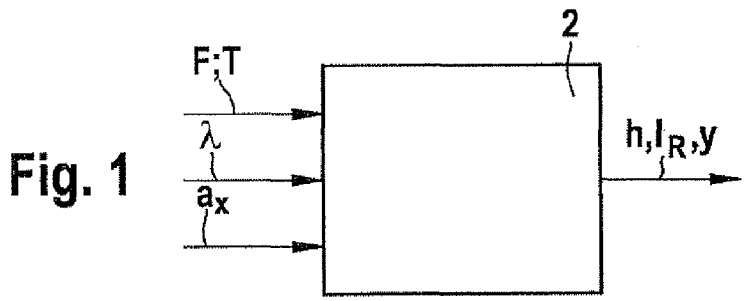

Fig. 1

$$\frac{F_F \cdot \lambda_R}{F_R \cdot \lambda_F} = \frac{g(l-l_R)+a_x \cdot h}{g \cdot l_R - a_x \cdot h}$$

Fig. 2

$$\dot{\omega}_{Fl}(t) = \frac{1}{J_R}\left[T_{Fl}(t) + \frac{c_F \cdot m \cdot r \cdot (g \cdot l_R - a_x(t) \cdot h)(v(t) - \omega_{Fl}(t) \cdot r)\left[-a_y(t) \cdot h + g\left(\frac{w}{2}+y\right)\right]}{g \cdot l \cdot v_x(t) \cdot w}\right]$$

$$\dot{\omega}_{Fr}(t) = \frac{1}{J_R}\left[T_{Fr}(t) + \frac{c_F \cdot m \cdot r \cdot (g \cdot l_R - a_x(t) \cdot h)(v(t) - \omega_{Fr}(t) \cdot r)\left[a_y(t) \cdot h + g\left(\frac{w}{2}-y\right)\right]}{g \cdot l \cdot v_x(t) \cdot w}\right]$$

$$\dot{\omega}_{Rl}(t) = \frac{1}{J_R}\left[T_{Rl}(t) + \frac{c_R \cdot m \cdot r \cdot (g \cdot (l-l_R) + a_x(t) \cdot h)(v(t) - \omega_{Rl}(t) \cdot r)\left[-a_y(t) \cdot h + g\left(\frac{w}{2}+y\right)\right]}{g \cdot l \cdot v_x(t) \cdot w}\right]$$

$$\dot{\omega}_{Rr}(t) = \frac{1}{J_R}\left[T_{Rr}(t) + \frac{c_R \cdot m \cdot r \cdot (g \cdot (l-l_R) + a_x(t) \cdot h)(v(t) - \omega_{Rr}(t) \cdot r)\left[a_y(t) \cdot h + g\left(\frac{w}{2}-y\right)\right]}{g \cdot l \cdot v_x(t) \cdot w}\right]$$

Fig. 3

METHOD AND DEVICE FOR DETERMINING A CENTER OF GRAVITY OF A MOTOR VEHICLE

FIELD OF THE INVENTION

The present invention relates to a method and an apparatus for determining a center of gravity of a motor vehicle.

BACKGROUND INFORMATION

Motor vehicles are generally equipped with safety functions and/or vehicle-dynamics control functions, for example with ESP. Because the motor vehicles, especially those having a high degree of loading variation (such as commercial vehicles), can have very different driving characteristics in the loaded state than in the unloaded state, the location of the motor vehicle's center of gravity, in particular in the loaded state, plays an important role as an input variable for many control functions.

German Patent Application No. DE 10 2004 056 108 A1 describes a method for approximately determining the location of the center of gravity of a vehicle. In this, an estimated value for the location of the center of gravity of the vehicle in the longitudinal direction is determined from the longitudinal forces of the wheels, the slope angle of the road, the longitudinal acceleration of the vehicle, and the wheelbase.

A fundamental principle with these and other conventional methods is that at least one spatial coordinate of the center of gravity is assumed to be known and is predefined. Depending on the motor vehicle and the loading of the motor vehicle, however, the center of gravity can be greatly displaced in all three spatial directions with respect to the vehicle center. This applies in particular to small vans and/or to vehicle carrying loads on a roof-mounted luggage rack.

SUMMARY

It is therefore an object of the present invention to create a method and an apparatus for determining the center of gravity of a motor vehicle, with which method and apparatus the center of gravity can be easily and accurately determined.

One aspect of the present invention includes the determination, for at least one wheel of the motor vehicle, of two respective different values representing a drive force (hereinafter "drive force values"), as well as associated longitudinal acceleration values and associated wheel slip values. From these state variables, all three coordinates of the center of mass can be easily and accurately calculated. Stipulation of a specific coordinate is no longer necessary. "Associated values" are to be understood here as ones that are measured either simultaneously or quasi-synchronously with the drive force values.

The center of mass is preferably the overall center of gravity of the motor vehicle, including load and, if applicable, including one or more persons.

A distance of the center of gravity from a rear axle of the motor vehicle, a height of the center of gravity, and a lateral deviation of the center of gravity from a longitudinal center axis of the motor vehicle are preferably used as the coordinates of the center of gravity.

An accurate knowledge of the center of gravity makes it possible to adapt vehicle safety systems and/or vehicle control systems to different load conditions, and thereby to improve driving safety.

The different drive force values are preferably determined at different points in time. The points in time are preferably far apart, preferably at least several seconds apart. The more different the driving situations, the more accurate in principle the result will be.

Alternatively, the different drive force values can also be determined continuously over time.

In a further advantageous embodiment, the coordinates of the center of gravity are determined using a recursive identification algorithm. This contributes to a particularly fast and precise determination of the coordinates. It is particularly advantageous in this context if the coordinates are determined using the least squares method (RLS), a Kalman filter, and/or an unscented Kalman filter (UKF). The Kalman filter generally determines a preferably optimum parameterization of a function depending on a number of state variables, for example depending on the drive force values, wheel slip values, and/or longitudinal acceleration values. The optimum parameterization is characterized, for example, by a minimum square error. The UKF is preferably used for highly nonlinear functions.

The coordinates of the center of gravity are preferably delivered as an input variable to a safety and/or control algorithm of the motor vehicle.

BRIEF DESCRIPTION OF THE DRAWINGS

The present invention will be described below by way of example with reference to the figures.

FIG. 1 shows an apparatus for determining a center of gravity of the motor vehicle.

FIG. 2 shows a first equation for determining two coordinates of the center of gravity.

FIG. 3 shows an equation system for determining the coordinates of the center of gravity.

DETAILED DESCRIPTION OF EXAMPLE EMBODIMENTS

Figure 4:
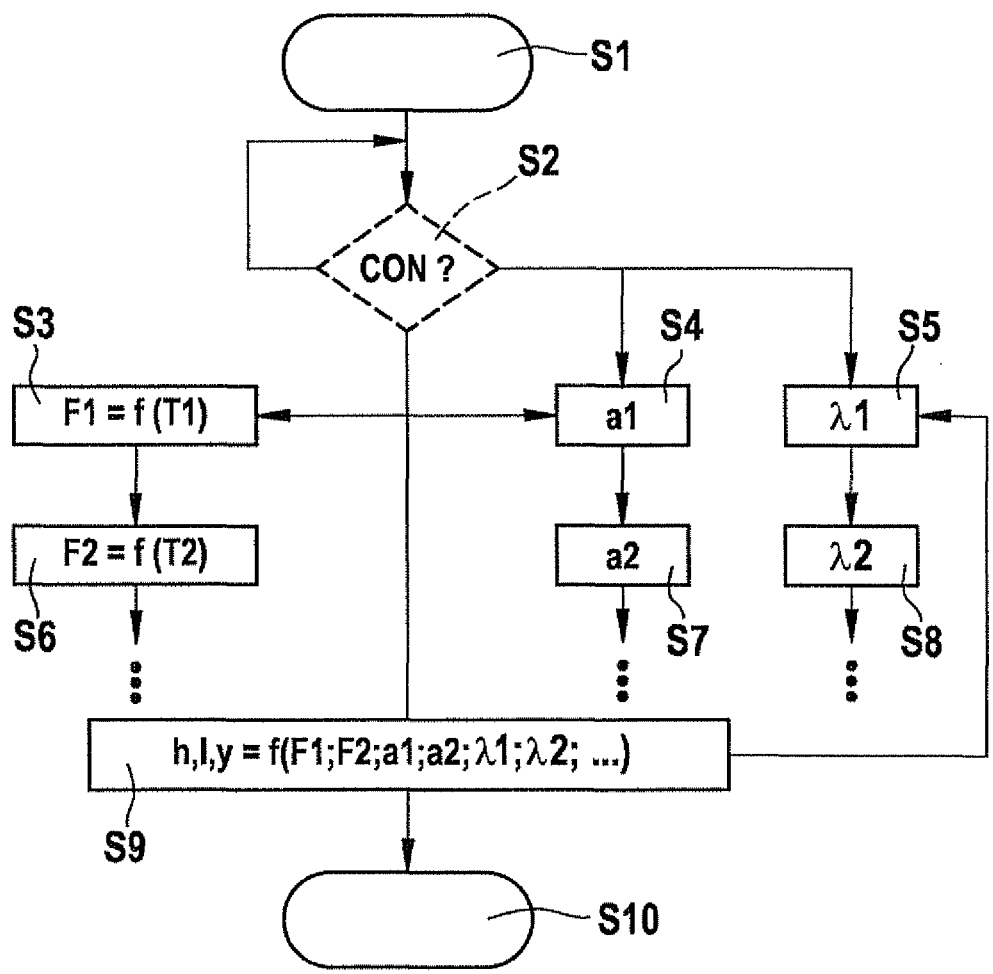
FIG. 4 is a flow chart of a program for determining the coordinates of the center of gravity.

FIG. 1 shows an apparatus 2 (FIG. 1), for example a control unit, for determining a center of gravity of a motor vehicle. Apparatus 2 encompasses a recursive identification algorithm, for example an RLS, a Kalman filter, or a UKF. These algorithms calculate one or more output variables by recursive identification as a function of multiple input variables; the output variables gradually approach the optimum values. The output variables are preferably parameters of formulas that are determined recursively.

The input variables delivered to apparatus 2 are at least drive force values F (from the engine control unit), wheel slip values $\lambda$, and longitudinal acceleration values $a_x$ (or values representative of these variables). Drive torques or brake torques T, for example, are representative of drive force values F. Drive force values F can also be negative, which in this case corresponds to a braking force.

Apparatus 2 furnishes as an output variable all three spatial coordinates of the center of gravity, e.g., a distance $l_R$ of the center of gravity from a rear axle of the motor vehicle, a height h of the center of gravity, and a lateral deviation y of the center of gravity from a longitudinal center axis of the motor vehicle. A different reference coordinate system can, alternatively, also be selected.

The coordinates h, $l_R$, y of the center of gravity are preferably delivered as input variables to a safety and/or control algorithm of the motor vehicle. The aforesaid functions (e.g. ESP, ABS, ASR, etc.) can thereby be adapted to different loading states. The operation of an ABS sensor, for example, can be improved if the distance $I_R$ is known, and driving safety benefits from this.

A first equation (FIG. 2) shows a simple relationship between the drive force values $F_F$, $F_R$ determined, as a function of measured values, at a wheel of a front axis and a rear axle of the motor vehicle, respectively; the wheel slip values $\lambda_F$, $\lambda_R$ associated therewith; and longitudinal acceleration values $a_x$ of the motor vehicle; and two of the coordinates of the center of gravity, in particular distance $I_R$ and height h. Also entering into this first equation are the acceleration of gravity g and a distance I between the front and rear axle of the motor vehicle. The first equation thus has two unknowns; distance $I_R$ and height h. The first equation cannot be solved with input variables that are determined once, in particular drive force values $F_F$, $F_R$ and longitudinal acceleration values $a_x$ and wheel slip values $\lambda_F$, $\lambda_R$ associated therewith. The equation is therefore solved by determining drive force values $F_F$, $F_R$ and the associated wheel slip values $\lambda_F$, $\lambda_R$ and longitudinal acceleration values $a_x$ at at least two or more different points in time. What results therefrom is a solvable, preferably overdetermined equation system with which the desired coordinates could be calculated very accurately. This first equation system is preferably used when the center of gravity is located approximately at the center of the motor vehicle in the Y direction. A further equation can also be used which contains the Y coordinates and a further coordinate as parameters, and with which the lateral deviation Y can be calculated.

According to FIG. 3, for example, an equation system made up of four differential equations, which each describe the rotational acceleration of one of the four wheels of the motor vehicle, is used. From each of the differential equations, all three coordinates h, $I_R$, y of the center of gravity can be respectively calculated. The result becomes more accurate, however, if at least two, preferably all, of the equations are solved, for example, using a recursive algorithm.

In these equations, the drive torques or braking torques T, in particular the drive or braking torques $T_{Fl}$, $T_{Fr}$, $T_{Rl}$, $T_{Rr}$ (left front, right front, left rear, and right rear, respectively) are representative of the drive force values F. The partial fraction term $(v(t)-(\omega(t)\times r))/v(t)$, which occurs in all the differential equations, is representative of the wheel slip values $\lambda$; the vehicle velocity v, wheel angular velocity $\omega$, and wheel radius r enter into the partial fraction term. The individual wheel angular velocities $\omega_{Fl}$, $\omega_{Fr}$, $\omega_{Rl}$, $\omega_{Rr}$ once again refer to the left front, right front, left rear, and right rear wheel, respectively. Also entering into the equation are the moments of inertia $J_F$, $J_R$ of the front and rear wheels, the wheel angular accelerations $\omega'_{Fl}$, $\omega'_{Fr}$, $\omega'_{Rl}$, $\omega'_{Rr}$, the longitudinal rigidity c, the mass m of the motor vehicle, the wheel radius r, preferably the transverse acceleration $a_y$, and the track w. The longitudinal rigidity c is the proportionality constant for describing the proportionality between the drive forces and the wheel slip values $\lambda$.

A program for determining the coordinates h, $I_R$, y of the center of gravity is preferably stored on a storage medium of apparatus 2 (FIG. 4). The program is started in a step S1, for example quasi-synchronously with engine startup of an internal combustion engine of the motor vehicle; if applicable, variables are initialized in step S1.

A step S2 can check whether a predefined condition CON is met. The predefined condition CON is preferably met if the motor vehicle is in a controlled driving situation, i.e., the wheel slip is less than a predefined threshold value.

If the condition in step S2 is met (outcome=y), steps S3, S4, and S5 are carried out preferably in parallel or at least quasi-synchronously. If applicable, step S2 is executed again if the condition of step S2 is not met.

In step S3, a first drive force value F1 is determined as a function of a first wheel torque T1. First wheel torque T1 can be measured, for example, with a torque sensor.

In step S4, a first longitudinal acceleration value a1 associated with the first drive force value F1 is determined, for example using an acceleration sensor. As an alternative to this, first longitudinal acceleration value a1 can be ascertained by differentiating velocity v over time.

In step S5, a first wheel slip value $\lambda 1$ associated with first drive force value F1 is measured, or estimated in known fashion.

Steps S6, S7, and S8 are executed in corresponding fashion after steps S3, S4, and S5; in steps S6, S7, and S8, second drive force value F2 as a function of a second wheel torque T2, the associated second longitudinal acceleration value a2, and the associated second wheel slip value $\lambda 2$ are determined.

In step S9 the coordinates h, $I_R$, y of the center of gravity are determined as a function of drive force values F1, F2, longitudinal acceleration values a1, a2, and wheel slip values $\lambda 1$, $\lambda 2$. This is done preferably on the basis of one of the formulas shown in FIGS. 2 and 3. Further measurements of drive force, longitudinal acceleration, and wheel slip may follow.

After step S9, steps S3 to S8 can be executed again. Alternatively, the program can terminate at step S10. The coordinates h, $I_R$, y of the center of gravity are preferably made available as input variables to a safety and/or control algorithm of the motor vehicle.

Figure 5:
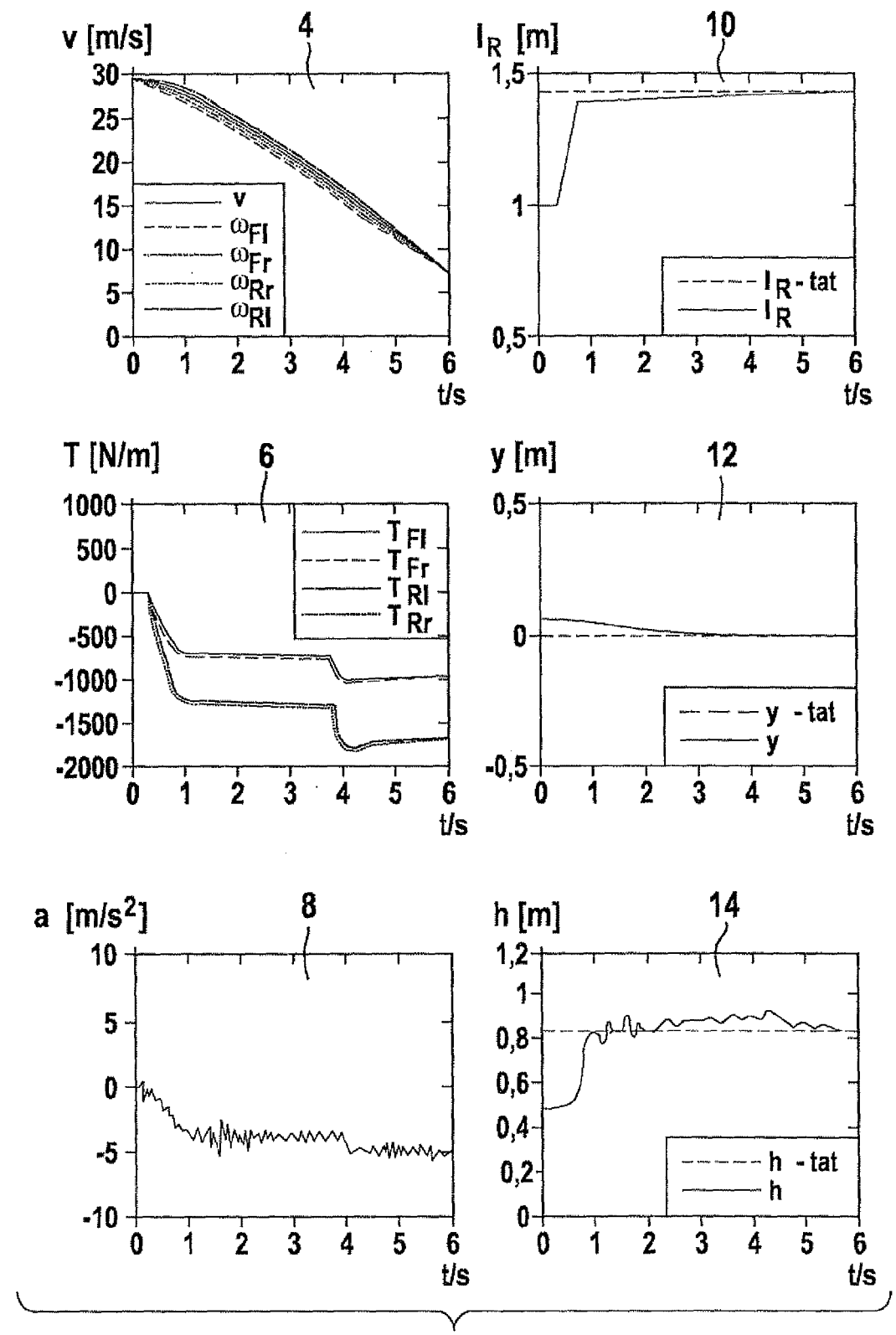
FIG. 5 shows six diagrams.

With this example method, the center of gravity can be determined very precisely within a few seconds, as is evident from diagrams 4, 6, 8, 10, 12, 14 (FIG. 5). In particular, a first diagram 4 shows velocity v of the motor vehicle and wheel angular velocities $\omega_{Fl}$, $\omega_{Fr}$, $\omega_{Rl}$, $\omega_{Rr}$ as a function of time t. Because velocities v, $\omega_{Fl}$, $\omega_{Fr}$, $\omega_{Rl}$, $\omega_{Rr}$ are becoming smaller, first diagram 4 shows a braking operation from almost 30 m/s to 5 m/s. The individual values are so close to one another that only a thick line is visible. This is representative of the fact that the wheels are running in stable fashion. This stable wheel running can be stipulated as a starting condition for an algorithm for determining coordinates h, $I_R$, y of the center of gravity, in particular as a condition CON in the program for determining coordinates h, $I_R$, y of the center of gravity.

During the braking operation shown in first diagram 4, a wheel torque $T_{Rl}$, $T_{Rr}$ of between 0 and $-1000$ Nm occurs at the wheels of the rear axle, and a wheel torque $T_{Fl}$, $T_{Fr}$ of between 0 and approx. $-1800$ Nm at the wheels of the front axle; this is depicted in a second diagram 6.

The wheel torques $T_{Rl}$, $T_{Rr}$, $T_{Fl}$, $T_{Rr}$ that occur cause a longitudinal acceleration (deceleration) $a_x$ that is depicted in a third diagram 8 and is equal to between 0 and $-5$ m/s².

As depicted in a fourth diagram 10, apparatus 2 furnishes, in one-second steps, the distance $I_R$ of the center of gravity from the rear axle (as depicted in a fifth diagram 12), the lateral deviation y of the center of gravity, and (as depicted in sixth diagram 14), the height h of the center of gravity; the coordinates h, $I_R$, y that are determined approach in stepwise fashion the actual coordinates h_act, $I_R$_act, y_act depicted with dashed lines.

What is claimed is:

1. A method for determining a center of gravity of a motor vehicle, comprising:
   determining, by a computer processor, two different torque values for at least one wheel of the motor vehicle, associated longitudinal acceleration values for the at least one wheel, and associated wheel slip values for the at least one wheel, and determining, by the processor, from the torque values, the associated longitudinal acceleration values, and the associated wheel slip values, at least two coordinates of the center of gravity of the motor vehicle.

2. The method as recited in claim 1, wherein the different torque values are each determined at different points in time.

3. The method as recited in claim 2, wherein the different torque values are determined continuously over time.

4. The method as recited in claim 1, wherein the coordinates of the center of gravity are provided to at least one of safety algorithm and a control algorithm of the motor vehicle.

5. The method as recited in claim 1, wherein the two different torque values on which basis the at least two coordinates are determined are torque values determined for a single wheel.

6. The method as recited in claim 1, wherein the at least two coordinates in combination define a single point of the center of gravity.

7. The method as recited in claim 1, wherein the at least two coordinates include three coordinates, each of the coordinates corresponding to a different respective one of three dimensions.

8. The method as recited in claim 2, wherein the coordinates of the center of gravity are determined using a recursive estimation algorithm.

9. The method as recited in claim 8, wherein the coordinates of the center of gravity are determined using a least squares method.

10. The method as recited in claim 8, wherein the coordinates of the center of gravity are determined using a Kalman filter.

11. The method as recited in claim 10, wherein the coordinates of the center of gravity are determined using a UKF.

12. An apparatus for determining a center of gravity of a motor vehicle, the apparatus configured to determine two different torque values for at least one wheel of a motor vehicle, associated longitudinal acceleration values for the at least one wheel, and associated wheel slip values for the at least one wheel, the apparatus further configured to determine from the torque values, the associated longitudinal acceleration values, and the associated wheel slip values, at least two coordinates of the center of gravity of the motor vehicle.

* * * * *